(12) United States Patent
    Kitamura

(10) Patent No.: US 11,139,096 B2
(45) Date of Patent: Oct. 5, 2021

(54) COMMON MODE CHOKE COIL AND WIRELESS CHARGING CIRCUIT

(71) Applicant: Murata Manufacturing Co., Ltd., Kyoto (JP)

(72) Inventor: Makoto Kitamura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 461 days.

(21) Appl. No.: 16/040,072

(22) Filed: Jul. 19, 2018

(65) Prior Publication Data

US 2019/0088390 A1    Mar. 21, 2019

(30) Foreign Application Priority Data

Sep. 19, 2017    (JP) .............................. JP2017-178746

(51) Int. Cl.
    *H01F 5/04*    (2006.01)
    *H02J 50/12*    (2016.01)
    (Continued)

(52) U.S. Cl.
    CPC ................. *H01F 5/04* (2013.01); *H01F 3/06* (2013.01); *H01F 27/2823* (2013.01); *H01F 27/2828* (2013.01); *H01F 27/29* (2013.01); *H01F 37/00* (2013.01); *H01F 37/005* (2013.01); *H02J 7/025* (2013.01); *H02J 50/12* (2016.02); *H01F 27/255* (2013.01); *H01F 38/14* (2013.01); *H01F 2017/0093* (2013.01)

(58) Field of Classification Search
    CPC ..... H01F 5/04; H01F 2017/0093; H02J 50/12
    See application file for complete search history.

(56) References Cited

U.S. PATENT DOCUMENTS 5,719,547 A  *  2/1998  Kaneko ................... H01F 27/29
                                                         336/180
2003/0071704 A1*  4/2003  Toi ........................ H01F 17/045
                                                         336/83

(Continued)

FOREIGN PATENT DOCUMENTS

JP          H0963850 A        3/1997
JP          H11127123 A       5/1999
                (Continued)

OTHER PUBLICATIONS

An Office Action mailed by the Japanese Patent Office dated Sep. 29, 2020, which corresponds to Japanese Patent Application No. 2017-178746 and is related to U.S. Appl. No. 16/040,072 with English language translation.

(Continued)

*Primary Examiner* — Elvin G Enad
*Assistant Examiner* — Malcolm Barnes
(74) *Attorney, Agent, or Firm* — Studebaker & Brackett PC

(57) ABSTRACT

A common mode choke coil comprising a core; a first wire and a second wire wound around the core; a first electrode part and a second electrode part disposed on the core and connected to the first wire; and a third electrode part and a fourth electrode part disposed on the core and connected to the second wire. The common mode choke coil has a self-resonance frequency of 700 MHz or more, and a common mode inductance of 300 nH or less, in a frequency band of 1 MHz or less.

21 Claims, 6 Drawing Sheets

(51) Int. Cl.
*H01F 17/00* (2006.01)
*H01F 3/06* (2006.01)
*H02J 7/02* (2016.01)
*H01F 37/00* (2006.01)
*H01F 27/28* (2006.01)
*H01F 27/29* (2006.01)
*H01F 27/255* (2006.01)
*H01F 38/14* (2006.01)

(56) References Cited

U.S. PATENT DOCUMENTS

| | | | | |
|---|---|---|---|---|
| 2007/0158782 A1* | 7/2007 | Heikkinen | ............ | H03F 3/45098 257/531 |
| 2008/0224813 A1* | 9/2008 | Hirai | ............ | H01F 17/045 336/216 |
| 2010/0045418 A1* | 2/2010 | Nishikawa | ............ | H01F 17/045 336/192 |
| 2010/0090790 A1* | 4/2010 | Azuma | ............ | H01F 17/045 336/192 |
| 2013/0076474 A1* | 3/2013 | Chang | ............ | H01F 17/0013 336/200 |
| 2014/0167903 A1* | 6/2014 | Tomonari | ............ | H01F 27/2823 336/220 |
| 2014/0266532 A1* | 9/2014 | Yamada | ............ | H01F 17/06 336/175 |
| 2014/0368307 A1* | 12/2014 | Kato | ............ | H01F 17/0013 336/200 |
| 2016/0365192 A1 | 12/2016 | Ohdaira | | |
| 2017/0133142 A1* | 5/2017 | Park | ............ | H03H 1/0007 |
| 2017/0214278 A1 | 7/2017 | Hosotani | | |
| 2017/0294261 A1* | 10/2017 | Sim | ............ | H01F 27/2804 |
| 2018/0040416 A1* | 2/2018 | Lestoquoy | ............ | H02J 50/12 |

FOREIGN PATENT DOCUMENTS

| | | |
|---|---|---|
| JP | H11329852 A | 11/1999 |
| JP | 2003-133148 A | 5/2003 |
| JP | 2004179314 A | 6/2004 |
| JP | 2009267223 A | 11/2009 |
| JP | 2010165953 A | 7/2010 |
| JP | 2011082926 A | 4/2011 |
| JP | 2017005572 A | 1/2017 |
| JP | 2017005842 A | 1/2017 |
| JP | 2017-070062 A | 4/2017 |
| WO | 2016/080045 A1 | 5/2016 |

OTHER PUBLICATIONS

An Office Action; "Notification of Reasons for Refusal," Mailed by the Japanese Patent Office dated Dec. 3, 2019, which corresponds to Japanese Patent Application No. 2017-178746 and is related to U.S. Appl. No. 16/040,072; with English language translation.

* cited by examiner

COMMON MODE CHOKE COIL AND WIRELESS CHARGING CIRCUIT

CROSS REFERENCE TO RELATED APPLICATION

This application claims benefit of priority to Japanese Patent Application 2017-178746 filed Sep. 19, 2017, the entire content of which is incorporated herein by reference.

BACKGROUND

Technical Field

The present disclosure relates to a common mode choke coil and a wireless charging circuit.

Background Art

A conventional common mode choke coil is described in Japanese Laid-Open Patent Publication No. 2003-133148. This common mode choke coil has a ferrite core, a plurality of wires wound around the core, and a plurality of electrode parts disposed on the core and connected to the plurality of wires.

SUMMARY

Although a common mode choke coil is generally used for removing exogenous noise (common mode noise) in a circuit transmitting/receiving differential signals, it is considered that the coil can be employed in a wide variety of other diverse applications. For example, it is conceivable that in a circuit (wireless charging circuit) wirelessly transmitting/receiving electric power in a low frequency band of several hundred kHz, such as a wireless charger thought to become widespread in the future, the coil may be used for removing exogenous noise in a high frequency band (several hundred MHz to over several GHz) mainly including communication waves for mobile phones, wireless LANs, etc.

Therefore, the present disclosure provides a common mode choke coil suitable for removing exogenous noise in a high frequency band in a circuit wirelessly transmitting/receiving electric power in a low frequency band and a wireless charging circuit including such a common mode choke coil.

That is, an aspect of the present disclosure provides a common mode choke coil comprising a core; a first wire and a second wire wound around the core; a first electrode part and a second electrode part disposed on the core and connected to the first wire; and a third electrode part and a fourth electrode part disposed on the core and connected to the second wire. The common mode choke coil has a self-resonance frequency of 700 MHz or more and a common mode inductance of 300 nH or less in a frequency band of 1 MHz or less.

In the common mode choke coil according to an aspect of the present disclosure, self-resonance occurs in a high frequency band of 700 MHz or more, resulting in extremely high impedance, while inductance is low in a low frequency band of 1 MHz or less. In this case, a common mode noise removal effect is significantly exerted in a certain high frequency region in which self-resonance occurs. On the other hand, the inductance of the common mode choke coil has a small influence on an LC resonant circuit included in a circuit wirelessly transmitting/receiving electric power in a low frequency band, so that adverse effects on oscillation and matching of the LC resonant circuit can be reduced. Therefore, the common mode choke coil suitable for removing exogenous noise in the high frequency band is acquired in the circuit wirelessly transmitting/receiving electric power in the low frequency band.

In an embodiment of the common mode choke coil, the common mode impedance is 180Ω or more in a frequency band of 700 MHz or more. According to the embodiment, noise in a high frequency range can more reliably be removed.

In an embodiment of the common mode choke coil, the self-resonance frequency is near any one frequency of 700 MHz, 800 MHz, 900 MHz, 1.5 GHz, 1.7 GHz, 2.0 GHz, 2.4 GHz. According to the embodiment, high impedance is obtained near the frequency associated with large intensity of exogenous noise such as a carrier frequency of a mobile phone and a communication frequency of a wireless LAN, so that measures can effectively be taken for the immunity.

In an embodiment of the common mode choke coil, the number of turns of each of the first and second wires is one or more and five or less (i.e., from one to five). According to the embodiment, low inductance can more reliably be achieved, and the stray capacitance of the coil can be reduced, so that a higher self-resonant frequency can be set.

In an embodiment of the common mode choke coil, regarding the common mode impedance, a half-value width of a peak value at the self-resonance frequency is 100 MHz or less. According to the embodiment, the rise of the impedance at the self-resonance frequency becomes sharp, so that the high frequency range can more accurately be targeted for the noise removal effect, while the influence in the other frequency bands can further be reduced.

In an embodiment of the common mode choke coil, the core has a first flange portion and a second flange portion disposed at a first end and a second end, and a winding core portion connecting the first flange portion and the second flange portion. The wires are wound around the winding core portion. The first electrode part, the second electrode part, the third electrode part, and the fourth electrode part are disposed on the first flange portion. According to the embodiment, when an end surface of the first flange portion of is mounted on a mounting substrate, the coil has the winding axis perpendicular to the mounting substrate and has a so-called longitudinal winding structure. The winding axis of the coil means the central axis of the helix of the coil. This increases the stray capacitance of the coil, so that an adjustment range of the self-resonance frequency can be made larger to improve a degree of freedom of design. Additionally, since even a wire with a large diameter can compactly be wound, and the current rating can easily be improved, the coil is more suitable for a circuit through which large current flows, such as a wireless charging circuit.

In an embodiment of the common mode choke coil, the core has a first flange portion and a second flange portion disposed at a first end and a second end, and a winding core portion connecting the first flange portion and the second flange portion. The wires are wound around the winding core portion. The first electrode part and the third electrode part are disposed on the first flange portion while the second electrode part and the fourth electrode part are disposed on the second flange portion. According to the embodiment, when a side surface of the first flange portion and a side surface of the second flange portion are mounted on a mounting substrate, the coil has the winding axis parallel to the mounting substrate and has a so-called lateral winding structure. As a result, the stray capacitance of the coil can be reduced, so that even when the wire of the same diameter is wound the same number of turns, the self-resonance frequency can be positioned on the higher frequency side than the longitudinal winding structure. The Q value of the coil is also improved by the reduction in the stray capacitance.

In an embodiment of the common mode choke coil, the common mode choke coil has a rated current of 1 A or more. According to the embodiment, the coil is adaptable to a circuit through which larger current flows.

In an embodiment of the common mode choke coil, the first and second wires each have a diameter of 100 μm or more. According to the embodiment, the coil is adaptable to a circuit through which larger current flows.

An aspect of the present disclosure provides a wireless charging circuit comprising an inverter; an LC resonant circuit including a coil and a capacitor; and the common mode choke coil connected between the inverter and the LC resonant circuit. The embodiment can provide a highly-reliable and highly-efficient wireless charging circuit hardly affected by exogenous noise in the high frequency band and improved in matching accuracy of transmitted/received electric power.

An aspect of the present disclosure can provide the common mode choke coil suitable for removing exogenous noise in a high frequency band in a circuit wirelessly transmitting/receiving electric power in a low frequency band and the wireless charging circuit including such a common mode choke coil.

DETAILED DESCRIPTION

An aspect of the present disclosure will now be described in detail with reference to shown embodiments.

First Embodiment

Figure 1:
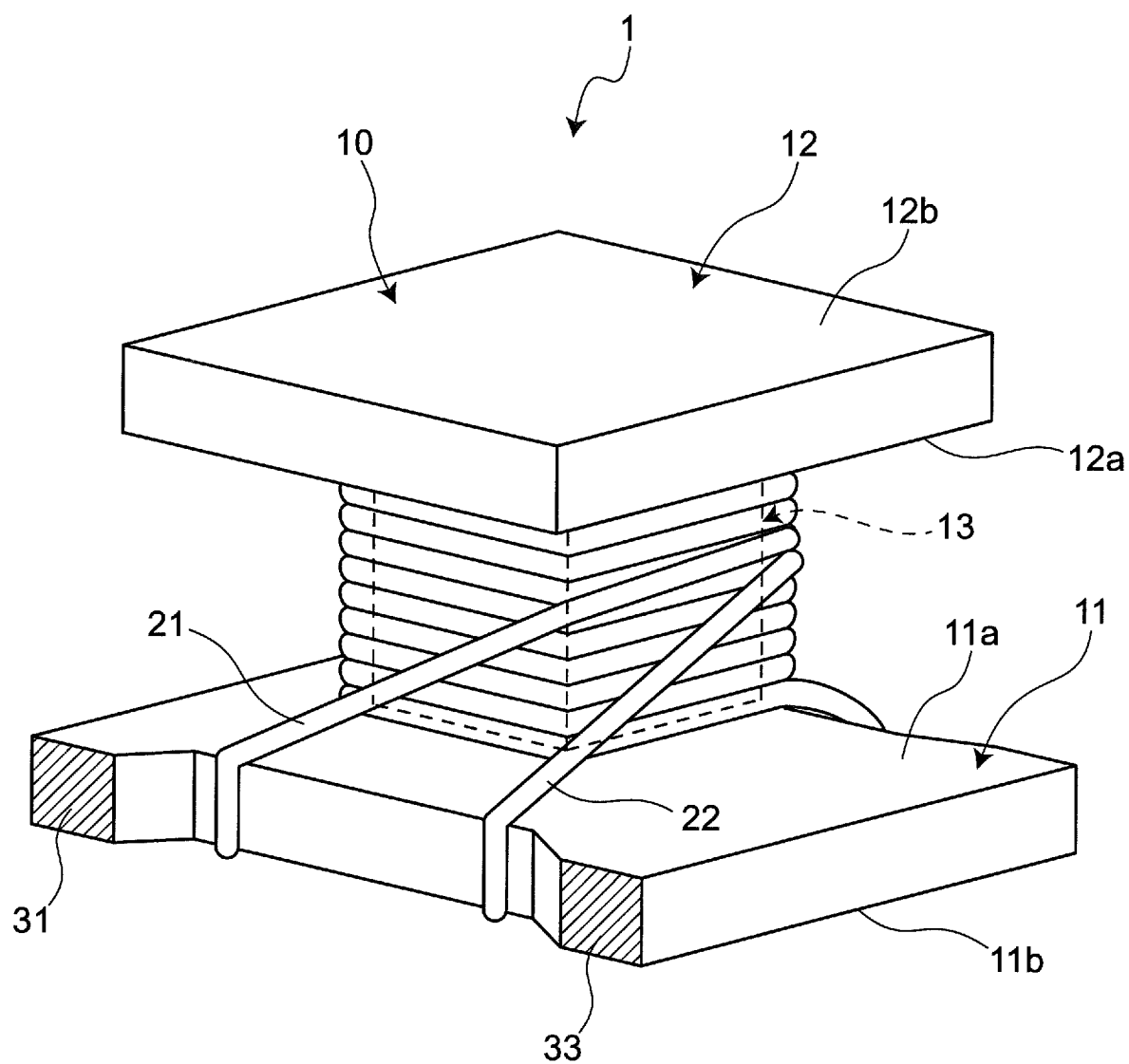
FIG. 1 is a perspective view of a first embodiment of a common mode choke coil.
Figure 2:
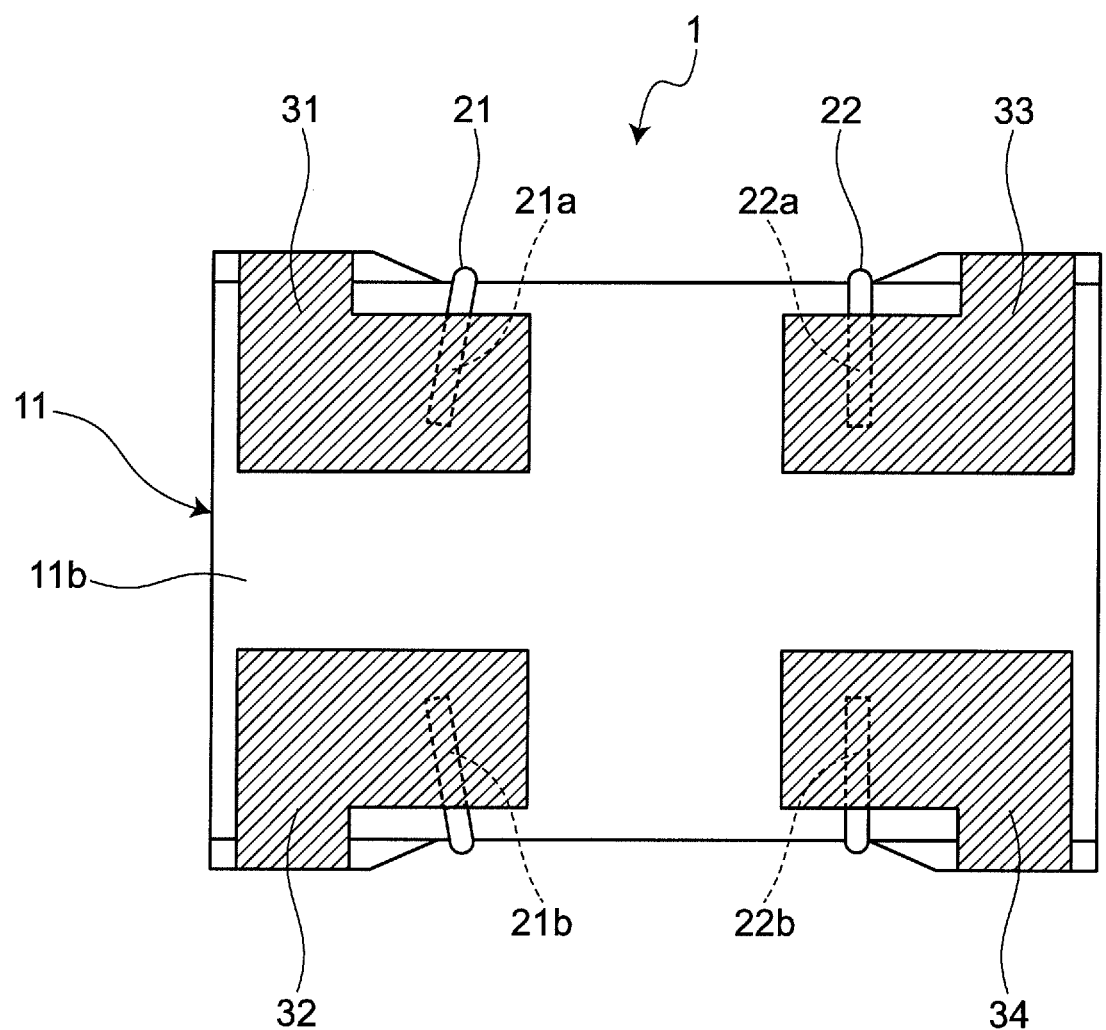
FIG. 2 is a bottom view of the common mode choke coil.

FIG. 1 is a perspective view of a common mode choke coil according to a first embodiment of the present disclosure. FIG. 2 is a bottom view of the common mode choke coil. As shown in FIGS. 1 and 2, a common mode choke coil 1 includes a core 10, a first wire 21 and a second wire 22 wound around the core 10, and four electrode parts 31 to 34.

The core 10 has a winding core portion 13, a first flange portion 11 disposed at a first end in the axial direction of the winding core portion 13, and a second flange portion 12 disposed at a second end in the axial direction of the winding core portion 13. The core 10 is made of a nonmagnetic material such as alumina and resin, for example.

The winding core portion 13 extends along the axial direction. The winding core portion 13 has the first and second wires 21, 22 wound around the axis thereof. The shape of the winding core portion 13 is a rectangular parallelepiped. The shape of the winding core portion 13 may be other shapes such as a cylinder, a triangular prism, and a polygonal prism having five or more sides.

The first flange portion 11 has a first end surface 11a connected to the first end of the winding core portion 13 and a second end surface 11b on the side opposite to the winding core portion 13 (the first end surface 11a). The second flange portion 12 has a first end surface 12a connected to the second end of the winding core portion 13 and a second end surface 12b on the side opposite to the winding core portion 13 (the first end surface 12a).

The four electrode parts 31 to 34 are disposed on the second end surface 11b of the first flange portion 11. In FIGS. 1 and 2, the electrode parts 31 to 34 are indicated by hatching for clarity. The electrode parts 31 to 34 are made of Ag etc. plated with Ni/Sn, for example.

The four electrode parts 31 to 34 are disposed at respective corner portions of the substantially rectangular second end surface 11b. The first electrode part 31 and the second electrode part 32 are oppositely arranged in a direction of one side of the second end surface 11b, and the third electrode part 33 and the fourth electrode part 34 are oppositely arranged in the direction of the one side of the second end surface 11b. The first electrode part 31 and the third electrode part 33 are oppositely arranged in a direction of the other side of the second end surface 11b, and the second electrode part 32 and the fourth electrode part 34 are oppositely arranged in the direction of the other side of the second end surface 11b.

Both ends 21a, 21b of the first wire 21 and both ends 22a, 22b of the second wire 22 are connected to the electrode parts 31 to 34 on the second end surface 11b of the first flange portion 11. Specifically, the first end 21a of the first wire 21 is electrically connected to the first electrode part 31, and the second end 21b of the first wire 21 is electrically connected to the second electrode part 32. The first end 22a of the second wire 22 is electrically connected to the third electrode part 33, and the second end 22b of the second wire 22 is electrically connected to the fourth electrode part 34.

The first and second wires 21, 22 each have a conductive wire and a coating film covering the conductive wire. The first and second wires 21, 22 have the same number of turns. The first wire 21 constitutes a single-layer primary winding, and the second wire 22 constitutes a single-layer secondary winding.

The four electrode parts 31 to 34 are electrically connected to electrodes of a mounting substrate not shown, and the common mode choke coil 1 is thereby mounted on the mounting substrate. Therefore, the second end surface 11b of the first flange portion 11 serves as a mounting surface mounted on the mounting substrate. When the second end surface 11b of the first flange portion 11 is mounted on the mounting substrate in this way, the coil 1 has a so-called longitudinal winding structure. In this case, an axis of the winding core portion 13 (a winding axis of the coil) is perpendicular to the mounting surface, and the electrode parts 31 to 34 are formed only on the first flange portion 11 on one side with the first and second flange portions 11, 12 arranged on the upper and lower sides of the winding core portion 13.

The common mode choke coil 1 has the following characteristics. The self-resonant frequency is 700 MHz or more, and the common mode inductance is 300 nH or less in a frequency band of 1 MHz or less. Therefore, self-resonance occurs in a high frequency band of 700 MHz or more, resulting in extremely high impedance, while the inductance is low in a low frequency band of 1 MHz or less.

In this case, a common mode noise removal effect is significantly exerted in a certain high frequency region in which self-resonance occurs. On the other hand, the inductance of the common mode choke coil 1 has a small influence on an LC resonant circuit included in a circuit wirelessly transmitting/receiving electric power in a low frequency band, so that adverse effects on oscillation and matching of the LC resonant circuit can be reduced. Therefore, the common mode choke coil 1 suitable for removing exogenous noise in the high frequency band is acquired in the circuit wirelessly transmitting/receiving electric power in the low frequency band.

When the second end surface 11b of the first flange portion 11 of the common mode choke coil 1 is mounted on the mounting substrate, the coil has the winding axis perpendicular to the mounting substrate and has a so-called longitudinal winding structure. The winding axis of the coil means the central axis of the helix of the coil. This increases the stray capacitance of the coil, so that an adjustment range of the self-resonance frequency can be made larger to improve a degree of freedom of design. Additionally, since even a wire with a large diameter can compactly be wound, and the current rating can easily be improved, the coil is more suitable for a circuit through which large current flows, such as a wireless charging circuit.

Preferably, the common mode impedance is 180Ω or more in a frequency band of 700 MHz or more. As a result, noise in a high frequency range can more reliably be removed.

Preferably, the self-resonance frequency is near any one frequency of 700 MHz, 800 MHz, 900 MHz, 1.5 GHz, 1.7 GHz, 2.0 GHz, and 2.4 GHz. Specifically, the term "near" means that a deviation of about ±10% relative to an oscillation frequency of a noise source is permitted. As a result, high impedance is obtained near the frequency associated with large intensity of exogenous noise such as a carrier frequency of a mobile phone and a communication frequency of a wireless LAN, so that measures can effectively be taken for the immunity.

Preferably, the number of turns of each of the first and second wires 21, 22 is one to five. As a result, low inductance can more reliably be achieved, and the stray capacitance of the coil can be reduced, so that a higher self-resonant frequency can be set.

Preferably, regarding the common mode impedance, the half-value width of the peak value at the self-resonance frequency is 100 MHz or less. As a result, the rise of the impedance at the self-resonance frequency becomes sharp, so that the high frequency range can more accurately be targeted for the noise removal effect, while the influence in the other frequency bands can further be reduced.

Preferably, the rated current is 1 A or more. As a result, the coil is adaptable to a circuit through which larger current flows. Preferably, the first and second wires 21, 22 each have a diameter of 100 μm or more. As a result, the coil is adaptable to a circuit through which larger current flows.

An example of the common mode choke coil 1 will hereinafter be described. The diameter of the wires is 190 μm. The material of the core is alumina. The outer diameter of the core is 5.0 mm×3.6 mm×2.2 mm. The thickness of the flange portions is 0.59 mm. The size of the winding core portion of the core is 1.5 mm square, and the height is 0.7 mm Description will be made of characteristic data of single-layer longitudinal winding with wires having the number of turns of 2 to 5.

Figure 3A:
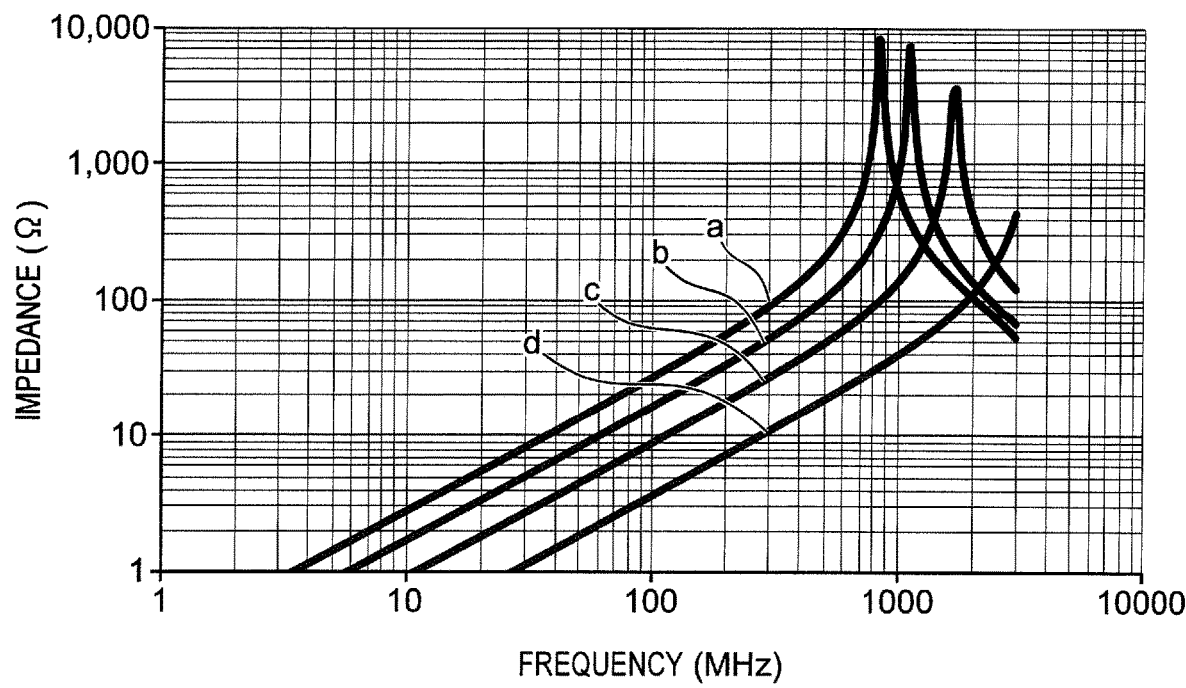
FIG. 3A is a graph of a relationship between frequency and impedance in a common mode when alumina is used for a core.
Figure 3B:
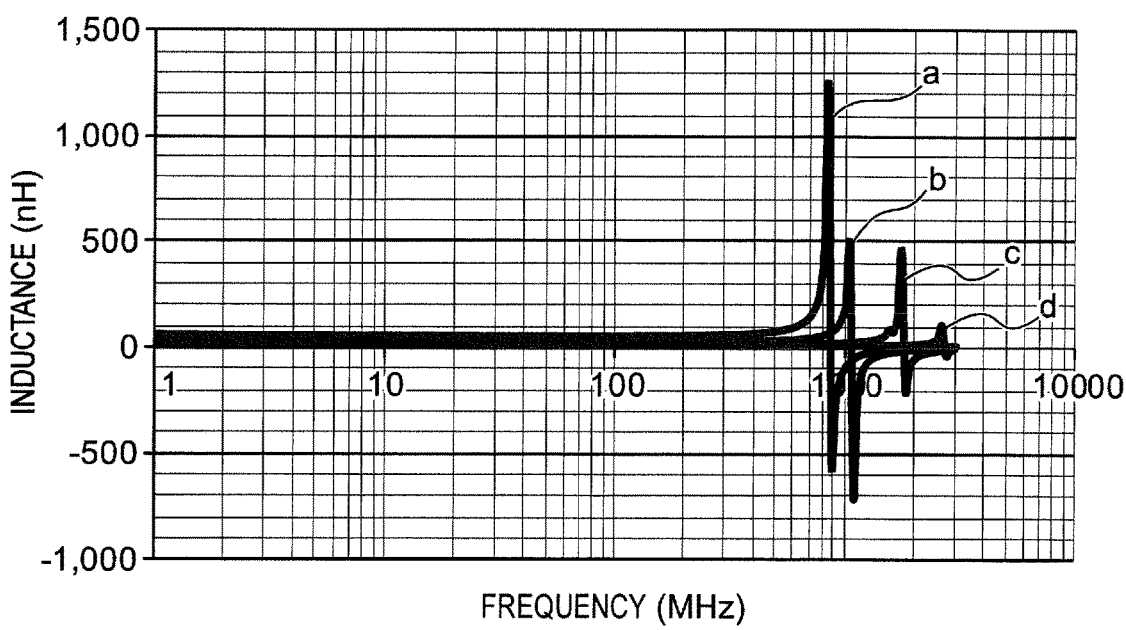
FIG. 3B is a graph of a relationship between frequency and inductance in the common mode when alumina is used for a core.

FIG. 3A shows a relationship between frequency and impedance in a common mode, and FIG. 3B shows a relationship between frequency and inductance in the common mode. In FIGS. 3A and 3B, graphs of a, b, c, and d correspond to the numbers of turns of five, four, three, and two, respectively. The data of FIGS. 3A and 3B are shown in Table 1.

TABLE 1

| number of turns | Z characteristics | | L characteristics | |
|---|---|---|---|---|
| | object frequency | impedance | object frequency | inductance |
| 2 | 2400 MHz or more | 180 Ω or more | 1700 MHz or less | 20 nH or less |
| 3 | 1300 MHz or more | 250 Ω or more | 900 MHz or less | 30 nH or less |
| 4 | 900 MHz or more | 500 Ω or more | 900 MHz or less | 90 nH or less |
| 5 | 700 MHz or more | 600 Ω or more | 700 MHz or less | 200 nH or less |

As shown in FIGS. 3A and 3B and Table 1, in this example, the impedance in the high frequency region of 700 MHz or more can be made higher, and the inductance in the frequency band of 1 MHz or less can be made lower.

When a magnetic material is used for the core, the magnetic permeability decreases when the frequency is several hundred MHz or more due to the Snoek's limit, so that high impedance cannot be acquired in the high frequency region; however, by using a nonmagnetic material for the core, this phenomenon can be avoided.

Since the inductance is proportional to a magnetic permeability of a core material, using the nonmagnetic material for the core material makes a value of the inductance lower as compared to a magnetic material core at other than the self-resonant frequency. Additionally, by setting the self-resonant frequency near an oscillation frequency of a noise source, high impedance can be obtained at this frequency even if the core is a non-magnetic material, and a sufficient noise reduction effect can be obtained. In the above description, the oscillation frequency of the noise source and the self-resonant frequency may not necessarily be completely identical. The self-resonance frequency may slightly deviate as long as necessary impedance can be maintained at the oscillation frequency of the noise source, and the self-resonance frequency may be "near" the oscillation frequency of the noise source. Specifically, the term "near" means that a deviation of about ±10% relative to the oscillation frequency of the noise source is permitted.

Figure 4A:
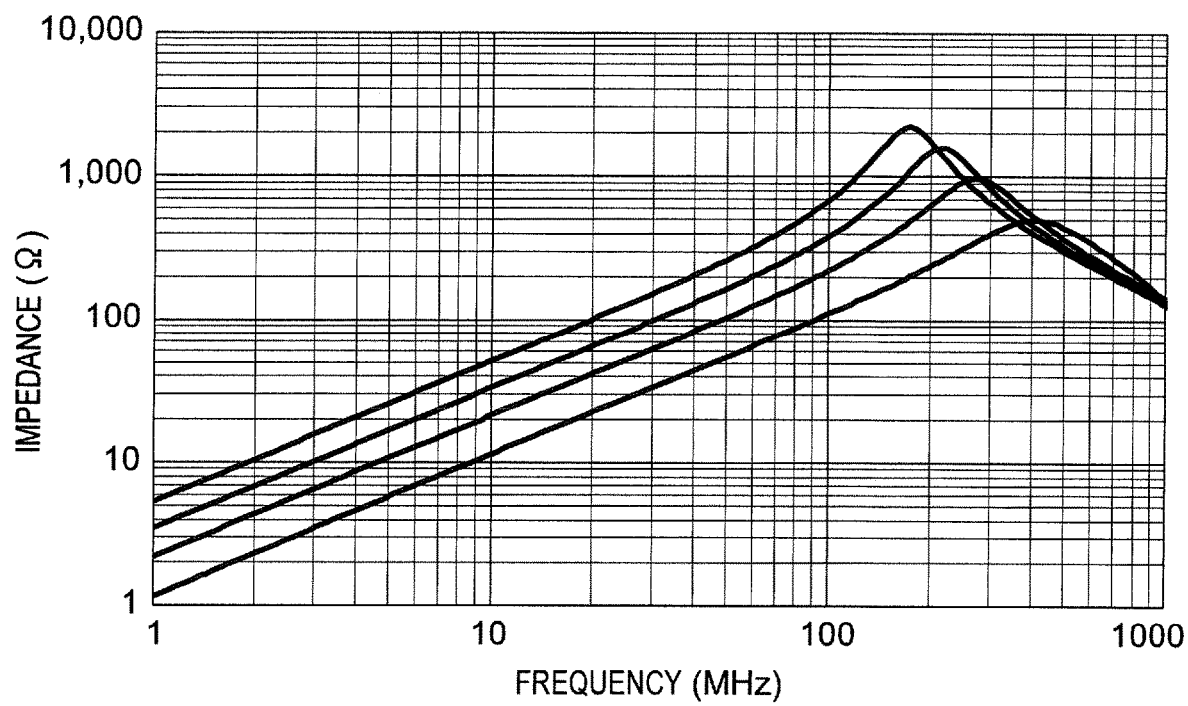
FIG. 4A is a graph of a relationship between frequency and impedance in the common mode when ferrite is used for a core.
Figure 4B:
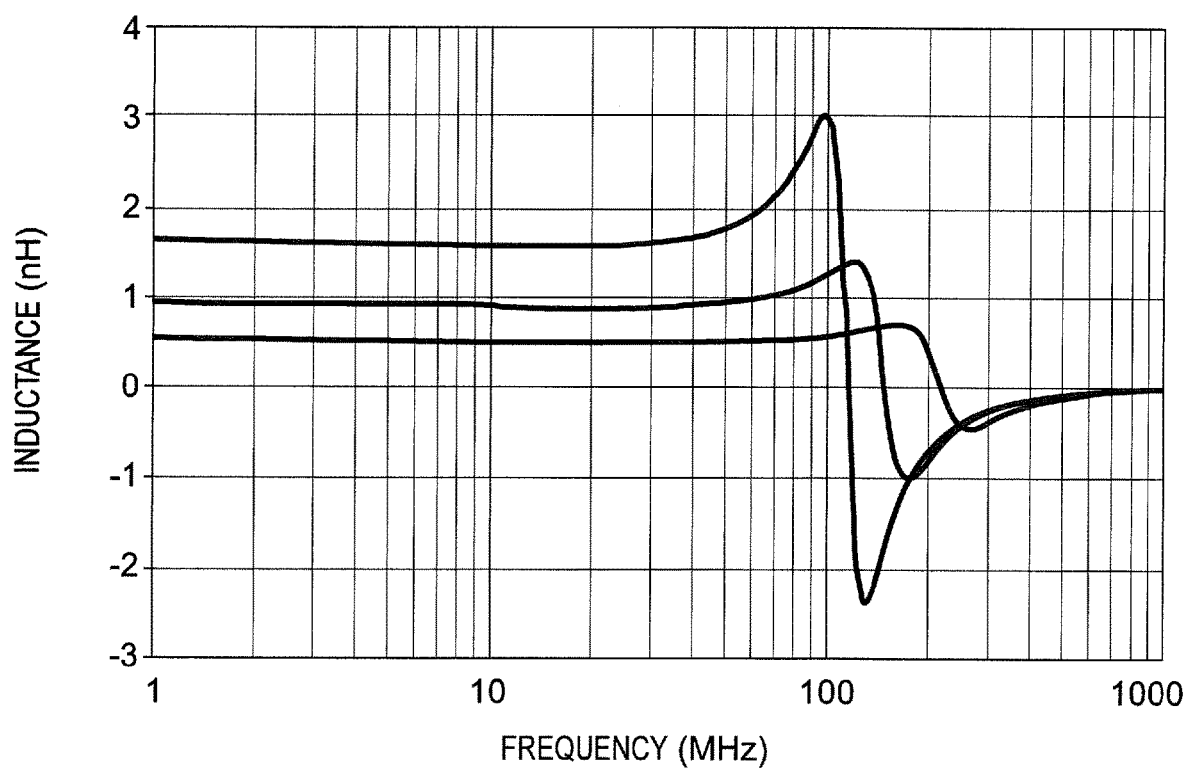
FIG. 4B is a graph showing a relationship between frequency and inductance in the common mode when ferrite is used for a core.

On the other hand, FIGS. 4A and 4B show characteristic data when ferrite is used as the core material. FIG. 4A shows a relationship between frequency and impedance in the common mode, and FIG. 4B shows a relationship between frequency and inductance in the common mode. FIG. 4A shows data of four types of comparative examples, and FIG. 4B shows data of three types of comparative examples. As shown in FIGS. 4A and 4B, the impedance is low in the high frequency region of 700 MHz or more, and the inductance is high in the frequency band of 1 MHz or less. Specifically, the impedance is 180Ω or less, and the inductance exceeds 300 nH, which is out of the range of this embodiment.

Second Embodiment

Figure 5:
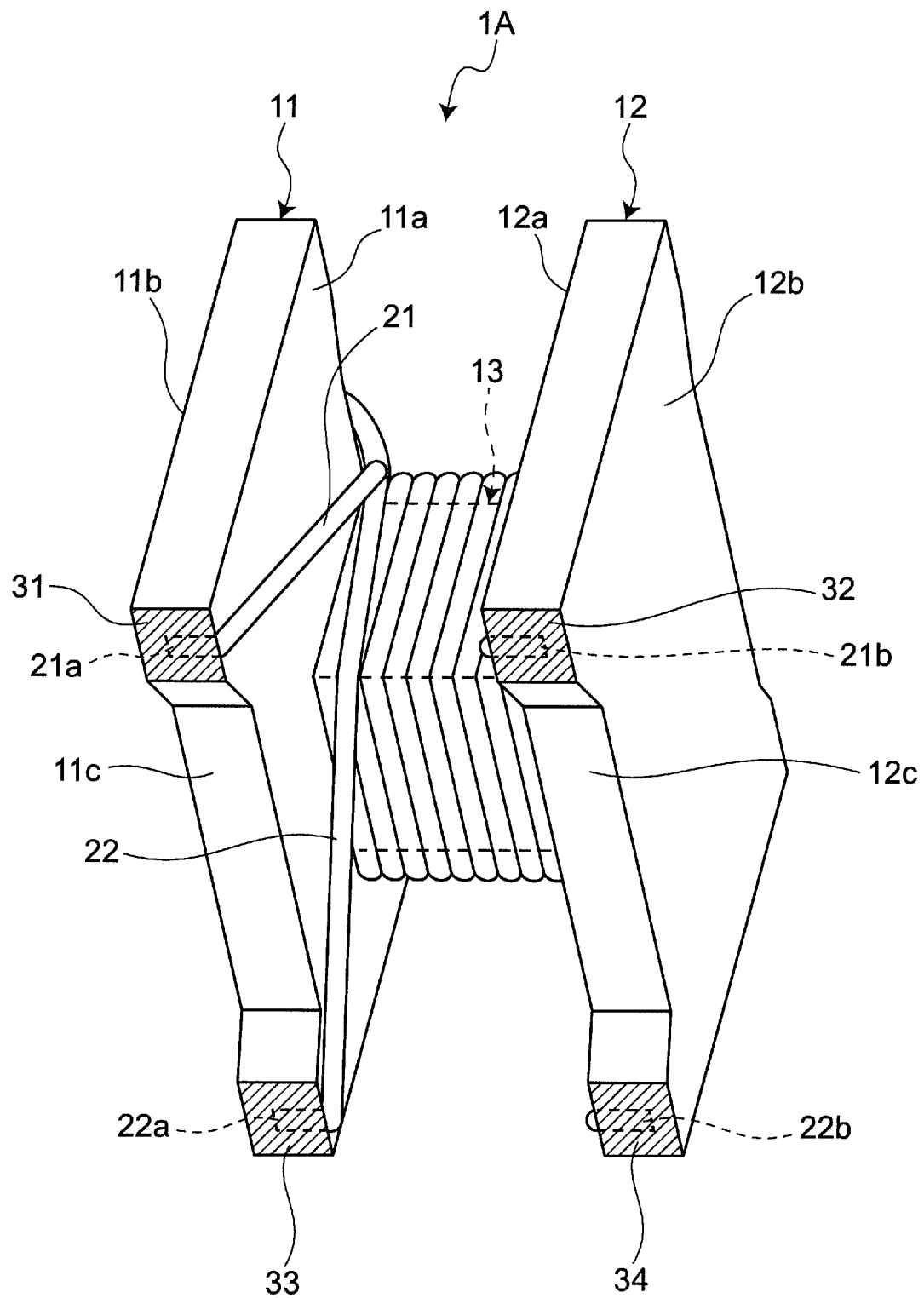
FIG. 5 is a perspective view of a second embodiment of a common mode choke coil.

FIG. 5 is a perspective view of a second embodiment of a common mode choke coil. The second embodiment is different from the first embodiment in the positions of the electrode parts. This different configuration will hereinafter be described. The other constituent elements are the same as those of the first embodiment and denoted by the same reference numerals as the first embodiment and will not be described.

As shown in FIG. 5, in a common mode choke coil 1A of the second embodiment, the first electrode part 31 and the third electrode part 33 are disposed on a side surface 11c of the first flange portion 11 along the axis of the winding core portion 13, and the second electrode part 32 and the fourth electrode part 34 are disposed on a side surface 12c of the second flange portion 12 along the axis of the winding core portion 13.

The side surface 11c of the first flange portion 11 is connected between the first end surface 11a and the second end surface 11b, and the side surface 12c of the second flange portion 12 is connected between the first end surface 12a and the second end surface 12b. The side surface 11c of the first flange portion 11 and the side surface 12c of the second flange portion 12 face in the same direction.

The four electrode parts 31 to 34 are electrically connected to electrodes of a mounting substrate not shown, and the common mode choke coil 1A is thereby mounted on the mounting substrate. Therefore, the side surface 11c of the first flange portion 11 and the side surface 12c of the second flange portion 12 serve as mounting surfaces mounted on the mounting substrate. When the side surface 11c of the first flange portion 11 and the side surface 12c of the second flange portion 12 are mounted on the mounting substrate, the coil 1A has a so-called lateral winding structure. In this case, the axis of the winding core portion 13 (the winding axis of the coil) is parallel to the mounting surfaces, the electrode parts 31 to 34 are formed on the first and second flange portions 11, 12 on both sides, and the first and second flange portions 11, 12 are arranged on the left and right sides of the winding core portion 13 in the horizontal direction.

Therefore, when the side surface 11c of the first flange portion 11 and the side surface 12c of the second flange portion 12 are mounted on the mounting substrate, the coil has the winding axis parallel to the mounting substrate and has a so-called lateral winding structure. As a result, the stray capacitance of the coil can be reduced, so that even when the wire of the same diameter is wound the same number of turns, the self-resonance frequency can be positioned on the higher frequency side than the longitudinal winding structure. The Q value of the coil is also improved by the reduction in the stray capacitance.

Third Embodiment

Figure 6:
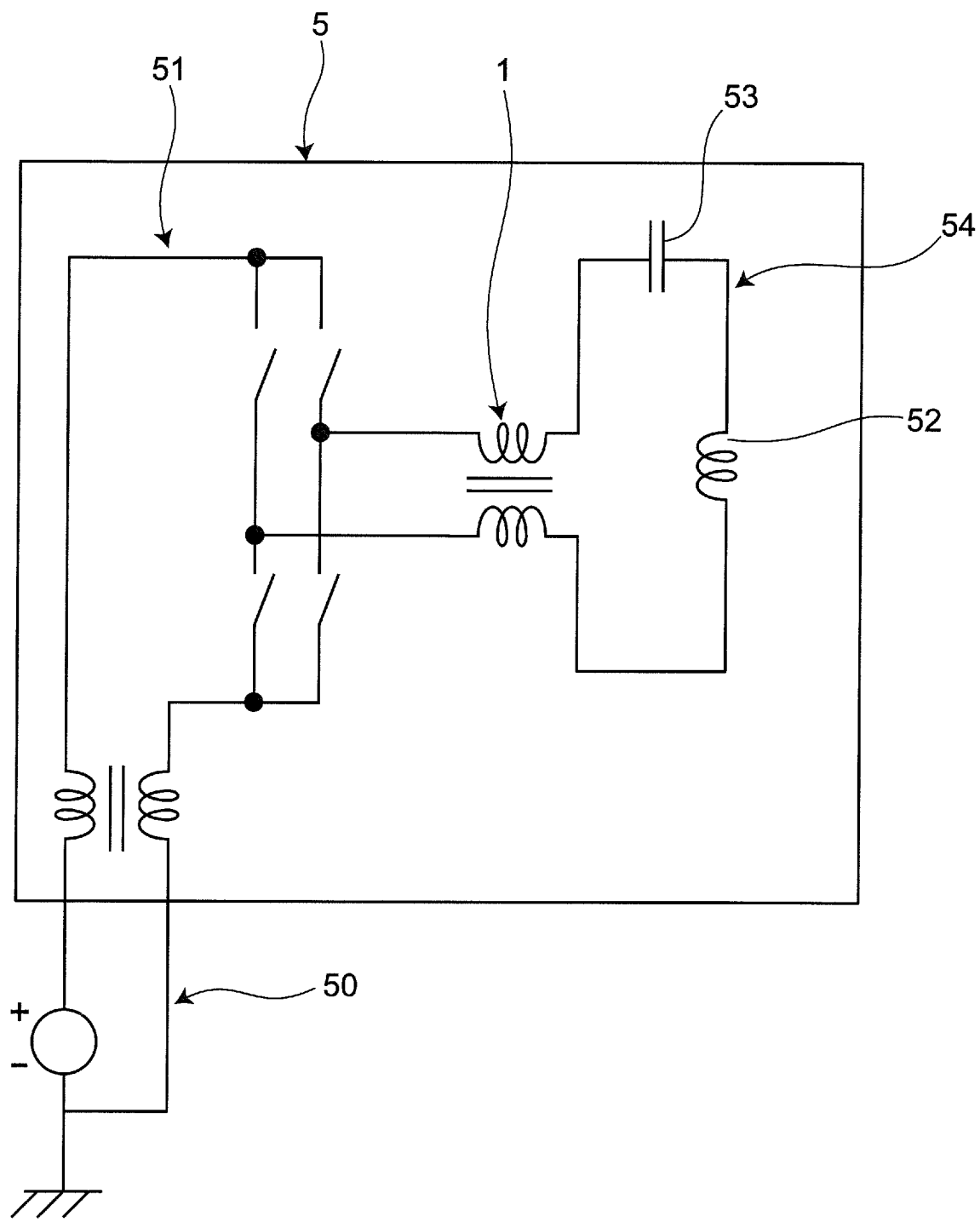
FIG. 6 is a simplified configuration diagram of a wireless charging circuit.

FIG. 6 shows a simplified configuration diagram of a power transmission circuit that is a kind of a wireless charging circuit according to an aspect of the present disclosure. As shown in FIG. 6, the power transmission circuit 5 includes an inverter 51, an LC resonant circuit 54, and the common mode choke coil 1 of the first embodiment connected between the inverter 51 and the LC resonant circuit 54. The common mode choke coil 1 may be the common mode choke coil 1A of the second embodiment.

The power transmission circuit 5 is used, for example, as a wireless charger, for wirelessly transmitting electric power for charging to a device to be charged. The inverter 51 is connected to a power source 50. The LC resonant circuit 54 includes a power transmission coil 52 and a capacitor 53 connected to the power transmission coil 52.

Therefore, the power transmission circuit 5 can provide a highly-reliable and highly-efficient wireless charging circuit hardly affected by exogenous noise in the high frequency band and improved in matching accuracy of transmitted/received electric power.

Although the example of the power transmission circuit is described in the embodiment, the wireless charging circuit using the common mode choke coil 1 may be a power receiving circuit (charging circuit on the side of the device to be charged). For example, in FIG. 6, the power supply 50 can be replaced with a secondary battery.

The present disclosure is not limited to the embodiments described above and may be changed in design without departing from the spirit of the present disclosure. For example, respective feature points of the first to third embodiments may variously be combined.

In the embodiments, the number of wires is two, and the single-layer primary and secondary windings are formed; however, multilayer primary and secondary windings may be formed. The number of wires may be more than two.

What is claimed is:

1. A common mode choke coil comprising:
   a core;
   a first wire and a second wire wound around the core;
   a first electrode part and a second electrode part disposed on the core and connected to the first wire; and
   a third electrode part and a fourth electrode part disposed on the core and connected to the second wire, wherein
   the common mode choke coil has a self-resonance frequency of 700 MHz or more, and a common mode inductance of 300 nH or less in a frequency band of 1 MHz or less.

2. The common mode choke coil according to claim 1, wherein
   a common mode impedance is 180Ω or more in a frequency band of 700 MHz or more.

3. The common mode choke coil according to claim 1, wherein
   the self-resonance frequency is near any one frequency of 700 MHz, 800 MHz, 900 MHz, 1.5 GHz, 1.7 GHz, 2.0 GHz, 2.4 GHz.

4. The common mode choke coil according to claim 1, wherein
   a number of turns of each of the first and second wires is from one to five.

5. The common mode choke coil according to claim 1, wherein
   regarding a common mode impedance, a half-value width of a peak value at the self-resonance frequency is 100 MHz or less.

6. The common mode choke coil according to claim 1, wherein:
   the core has a first flange portion and a second flange portion disposed at a first end and a second end, and a winding core portion connecting the first flange portion and the second flange portion,
   the first and second wires are wound around the winding core portion, and
   the first electrode part, the second electrode part, the third electrode part, and the fourth electrode part are disposed on the first flange portion.

7. The common mode choke coil according to claim 1, wherein:
the core has a first flange portion and a second flange portion disposed at a first end and a second end, and a winding core portion connecting the first flange portion and the second flange portion,
the first and second wires are wound around the winding core portion, and
the first electrode part and the third electrode part are disposed on the first flange portion, while the second electrode part and the fourth electrode part are disposed on the second flange portion.

8. The common mode choke coil according to claim 1, wherein
the common mode choke coil has a rated current of 1 A or more.

9. The common mode choke coil according to claim 1, wherein
the first and second wires each have a diameter of 100 μm or more.

10. A wireless charging circuit comprising:
an inverter;
an LC resonant circuit including a coil and a capacitor; and
the common mode choke coil according to claim 1 connected between the inverter and the LC resonant circuit.

11. The common mode choke coil according to claim 2, wherein
the self-resonance frequency is near any one frequency of 700 MHz, 800 MHz, 900 MHz, 1.5 GHz, 1.7 GHz, 2.0 GHz, 2.4 GHz.

12. The common mode choke coil according to claim 2, wherein
a number of turns of each of the first and second wires is from one to five.

13. The common mode choke coil according to claim 3, wherein
a number of turns of each of the first and second wires is from one to five.

14. The common mode choke coil according to claim 2, wherein
regarding a common mode impedance, a half-value width of a peak value at the self-resonance frequency is 100 MHz or less.

15. The common mode choke coil according to claim 3, wherein
regarding a common mode impedance, a half-value width of a peak value at the self-resonance frequency is 100 MHz or less.

16. The common mode choke coil according to claim 2, wherein:
the core has a first flange portion and a second flange portion disposed at a first end and a second end, and a winding core portion connecting the first flange portion and the second flange portion,
the first and second wires are wound around the winding core portion, and
the first electrode part, the second electrode part, the third electrode part, and the fourth electrode part are disposed on the first flange portion.

17. The common mode choke coil according to claim 2, wherein:
the core has a first flange portion and a second flange portion disposed at a first end and a second end, and a winding core portion connecting the first flange portion and the second flange portion,
the first and second wires are wound around the winding core portion, and
the first electrode part and the third electrode part are disposed on the first flange portion, while the second electrode part and the fourth electrode part are disposed on the second flange portion.

18. The common mode choke coil according to claim 2, wherein
the common mode choke coil has a rated current of 1 A or more.

19. The common mode choke coil according to claim 2, wherein
the first and second wires each have a diameter of 100 μm or more.

20. A wireless charging circuit comprising:
an inverter;
an LC resonant circuit including a coil and a capacitor; and
the common mode choke coil according to claim 2 connected between the inverter and the LC resonant circuit.

21. The common mode choke coil according to claim 1, wherein
the core is made of a nonmagnetic material.

* * * * *